United States Patent
Smith

(10) Patent No.: US 8,297,653 B2
(45) Date of Patent: Oct. 30, 2012

(54) PYROTECHNIC INFLATOR WITH COMPOSITE OVERWRAP

(75) Inventor: Bradley W. Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 39 days.

(21) Appl. No.: 13/051,855

(22) Filed: Mar. 18, 2011

(65) Prior Publication Data

US 2012/0235392 A1    Sep. 20, 2012

(51) Int. Cl.
*B60R 21/26*    (2011.01)

(52) U.S. Cl. .......................................... 280/741; 280/742

(58) Field of Classification Search ................... 280/740, 280/741, 742
See application file for complete search history.

(56) References Cited

U.S. PATENT DOCUMENTS

| | | | |
|---|---|---|---|
| 3,772,062 A | 11/1973 | Shur et al. | |
| 3,969,812 A | 7/1976 | Beck | |
| 4,640,312 A | 2/1987 | Patell et al. | |
| 4,865,210 A | 9/1989 | Brainard, II | |
| 5,028,070 A * | 7/1991 | Bender | 280/741 |
| 5,062,367 A | 11/1991 | Hayashi et al. | |
| 5,100,171 A * | 3/1992 | Faigle et al. | 280/736 |
| 5,264,059 A | 11/1993 | Jacaruso et al. | |
| 5,340,148 A | 8/1994 | Faigle et al. | |
| 5,492,364 A | 2/1996 | Anderson et al. | |
| 5,671,946 A * | 9/1997 | Whalen et al. | 280/741 |
| 7,147,124 B2 | 12/2006 | Minta et al. | |
| 7,175,894 B2 | 2/2007 | Nakamura | |
| 7,516,983 B2 * | 4/2009 | Suehiro et al. | 280/741 |
| 7,597,353 B2 | 10/2009 | Smith et al. | |
| 2004/0235378 A1 | 11/2004 | Byma et al. | |
| 2005/0225064 A1 * | 10/2005 | Suehiro et al. | 280/741 |
| 2006/0060325 A1 | 3/2006 | Gordon et al. | |
| 2006/0267322 A1 | 11/2006 | Eckelberg | |
| 2007/0125488 A1 | 6/2007 | Brisson et al. | |

OTHER PUBLICATIONS

Co-pending U.S. Appl. No. 13/051,840, Smith et al., "Compressed Gas Inflator with Composite Overwrapm," filed Mar. 18, 2011.

* cited by examiner

*Primary Examiner* — Toan To
(74) *Attorney, Agent, or Firm* — Sally J. Brown; Pauley, Petersen & Erickson

(57) ABSTRACT

A pyrotechnic inflator assembly including a shell member and an end cap joinable with the shell member to form a subassembly. The subassembly containing a quantity of pyrotechnic material and at least in part defining a combustion chamber wherein at least a portion of the quantity of pyrotechnic material is reactable to form product gas for inflation of an associated airbag cushion and to generate pressure within the combustion chamber. The inflator assembly further including an overwrap about at least a portion of the subassembly to form a pyrotechnic inflator assembly that withstands the pressure generated within the combustion chamber upon reaction of the pyrotechnic material.

21 Claims, 4 Drawing Sheets

PYROTECHNIC INFLATOR WITH COMPOSITE OVERWRAP

BACKGROUND OF THE INVENTION

This invention relates generally to the providing or supplying of inflation gas. More particularly, the invention relates to assemblies for providing or supplying an inflation gas such as may be desired for certain inflatable passive restraint systems for use in vehicles for restraining the movement of an occupant in the event of a vehicular collision as well as methods of forming or making such inflator assemblies.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. For example, typical or customary vehicular airbag cushion installation locations have included in the steering wheel, in the dashboard on the passenger side of a car, along the roof line of a vehicle such as above a vehicle door, and in the vehicle seat such as in the case of a seat-mounted airbag cushion. Other airbag cushions such as in the form of knee bolsters and overhead airbags also operate to protect other or particular various parts of the body from collision.

In addition to one or more airbag cushions, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion. Various types or forms of inflator devices have been disclosed in the art for use in inflating an inflatable restraint system airbag cushion.

One particularly common type or form of inflator device used in inflatable passive restraint systems is commonly referred to as a pyrotechnic inflator. In such inflator devices, gas used in the inflation of an associated inflatable element is derived from the combustion of a pyrotechnic gas generating material.

Typically, pyrotechnic inflators include a pressure vessel housing so as to be able to withstand the 10 MPa to 30 MPa internal pressures created during combustion of the pyrotechnic gas generating material contained within the inflator. In practice, such pressure vessels are commonly made by welding together two or more metal, e.g., steel or aluminum, components after the loading therein of the inflator internal contents, such as the pyrotechnic gas generating material, for example.

The automotive industry, however, continues to seek inflatable restraint systems that are smaller, lighter, and less expensive to manufacture. As industry constraints regarding factors such as the weight and size of vehicle components continue to evolve, corresponding changes to associated inflatable restraint systems are desired and required in order to better satisfy such constraints.

SUMMARY OF THE INVENTION

The present invention provides improved pyrotechnic inflator assemblies as well as methods of or for making such pyrotechnic inflator assemblies.

In accordance with one aspect, there is provided a pyrotechnic inflator assembly that contains a quantity of pyrotechnic material and has an initiator that upon actuation initiates reaction of the pyrotechnic material. The pyrotechnic inflator assembly includes a shell member and an end cap joinable with the shell member. The shell member has an open end and includes a plurality of flow control features for controlling flow of product gas from the shell member. The end cap is joinable with the shell member to at least in part enclose the open end of the shell member to define a subassembly. The subassembly contains a quantity of pyrotechnic material and at least in part defines a combustion chamber wherein at least a portion of the quantity of pyrotechnic material is reactable to form product gas for inflation of an associated airbag cushion and to generate pressure within the combustion chamber. The pyrotechnic inflator assembly also includes an overwrap about at least a portion of the subassembly such that the assembly can withstand the pressure generated within the combustion chamber upon reaction of the pyrotechnic material. The overwrap includes a composite of fibers and a resin matrix system.

In accordance with another embodiment there is provided a pyrotechnic inflator assembly that includes a shell member having an open end. The shell member also includes a plurality of flow control orifices for controlling flow of product gas from the shell member. An end cap is joinable with the shell member to at least in part enclose the open end of the shell member to form a subassembly. The subassembly contains a quantity of pyrotechnic material and at least in part defines a combustion chamber wherein the at least a portion of the quantity of pyrotechnic material is reactable to form product gas for inflation of an associated airbag cushion and to generate pressure within the combustion chamber. The subassembly also contains a filter element at least in part disposed between the quantity of pyrotechnic material and the flow control orifices. The end cap at least in part contains an initiator that upon actuation initiates reaction of the pyrotechnic material. The end cap also includes mounting provisions for mounting the inflator assembly into an airbag module. The assembly further includes an overwrap about at least a portion of the subassembly to form a pyrotechnic inflator assembly that withstands the pressure generated within the combustion chamber upon reaction of the pyrotechnic material. The overwrap includes a composite of fibers of one or more of glass and basalt and a resin matrix system. The shell member of the assembly is incapable of withstanding the pressure generated within the combustion chamber upon reaction of the pyrotechnic material without support provided by the overwrap.

In another aspect, there is provided a method of making a pyrotechnic inflator assembly. In accordance with one such method of making a pyrotechnic inflator assembly, a shell member having an open end is joined with an end cap to at least in part enclose the open end of the shell member to form a subassembly. The subassembly contains a quantity of pyrotechnic material and at least in part defines a combustion chamber wherein the at least a portion of the quantity of pyrotechnic material is reactable to form product gas for inflation of an associated airbag cushion and to generate pressure within the combustion chamber. The method further involves overwrapping the subassembly with a composite of fibers and a resin matrix system. The composite overwrapped subassembly is UV cured to form a pyrotechnic inflator assembly that withstands the pressure generated within the combustion chamber upon reaction of the pyrotechnic material and wherein the shell member is incapable of withstanding the pressure generated within the combustion chamber upon reaction of the pyrotechnic material without support provided by the composite overwrap.

Other objects and advantages will be apparent to those skilled in the art from the following detailed description taken in conjunction with the appended claims and drawings.

DETAILED DESCRIPTION OF THE INVENTION

As described in greater detail below, the present invention provides improved pyrotechnic inflator assemblies as well as methods of or for making such pyrotechnic inflator assemblies.

Figure 2:
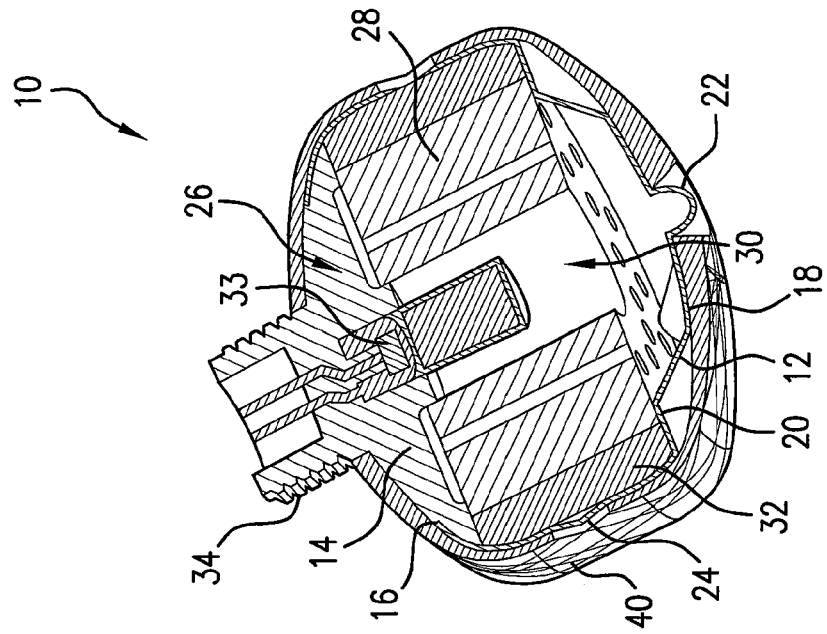
FIG. 2 is a sectional view of the pyrotechnic inflator assembly shown in FIG. 1.
Figure 1:
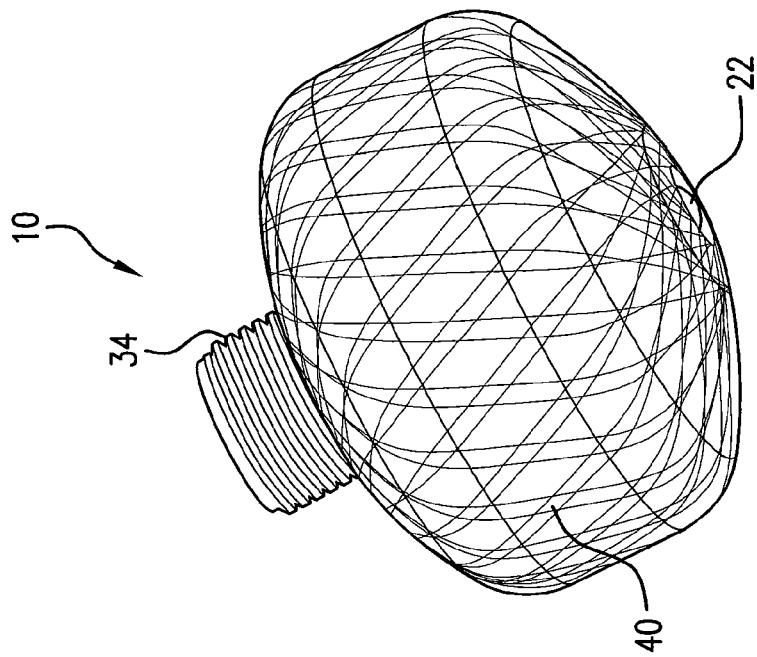
FIG. 1 is a perspective view of a pyrotechnic inflator assembly in accordance with one aspect of the invention.

FIGS. 1 and 2 illustrate a pyrotechnic inflator assembly in accordance with one aspect of the invention and generally designated by the reference numeral 10. The pyrotechnic inflator assembly 10 is generally composed of a shell member 12 and an end cap 14. The shell member 12 includes an open end 16, such as to permit access to the interior of the shell member, and a closed end 18, generally opposite the open end 16.

In this illustrated embodiment, the shell member 12 has a generally elliptical, truncated bulbous or rounded disc form or shape. Those skilled in the art and guided the teaching herein provided, however, will appreciate that shell members of other forms or shapes can, if desired, be used. While spherical shaped shell members can be advantageous from a structural design view, the utilization of such a spherical shaped shell member can result in an inflator assembly of too great an overall height such as to hinder installation and placement of such an inflator assembly in a selected vehicle. On the other hand, the utilization of a flat, closed end shell member while generally resulting in a smaller or smallest height inflator assembly does not generally form as a strong a structural component as may be desired. Thus, the use of an elliptical shaped shell member can advantageously provide structural design while reducing the height of the resulting inflator assembly.

As detailed further below, if desired, the shell member 12 can include one or more additional structural features such as may be desired to facilitate manufacture, production and/or operation of the inflator assembly. For example, the shell member 12 is shown, as perhaps best seen in FIG. 2 and FIG. 3, as including four (4) generally equally spaced indentations 20 and a central projection 22.

As will be described in greater detail below, the shell member 12 can desirably be fabricated or formed of metal, such as drawn steel or aluminum, for example, wherein the metal is relatively thin as compared to conventional pyrotechnic pressure vessel housings. For example, whereas conventional pyrotechnic pressure vessel metal housings are commonly 2 to 3 mm thick, the invention permits the utilization of metal shell members having a thickness of less than 1 mm and in some cases having a thickness of less than 0.5 mm, e.g., a metal shell member having a thickness of 0.4 mm or less. In some preferred embodiments, the shell member can, if desired, be formed of plastic, such as plastic molded in a desired shape.

The shell member 12 contains or includes a plurality of flow control features, such as in the form of orifices 24. As further described below, the orifices 24 facilitate control of the flow of product gas from the shell member 12.

Figure 3:
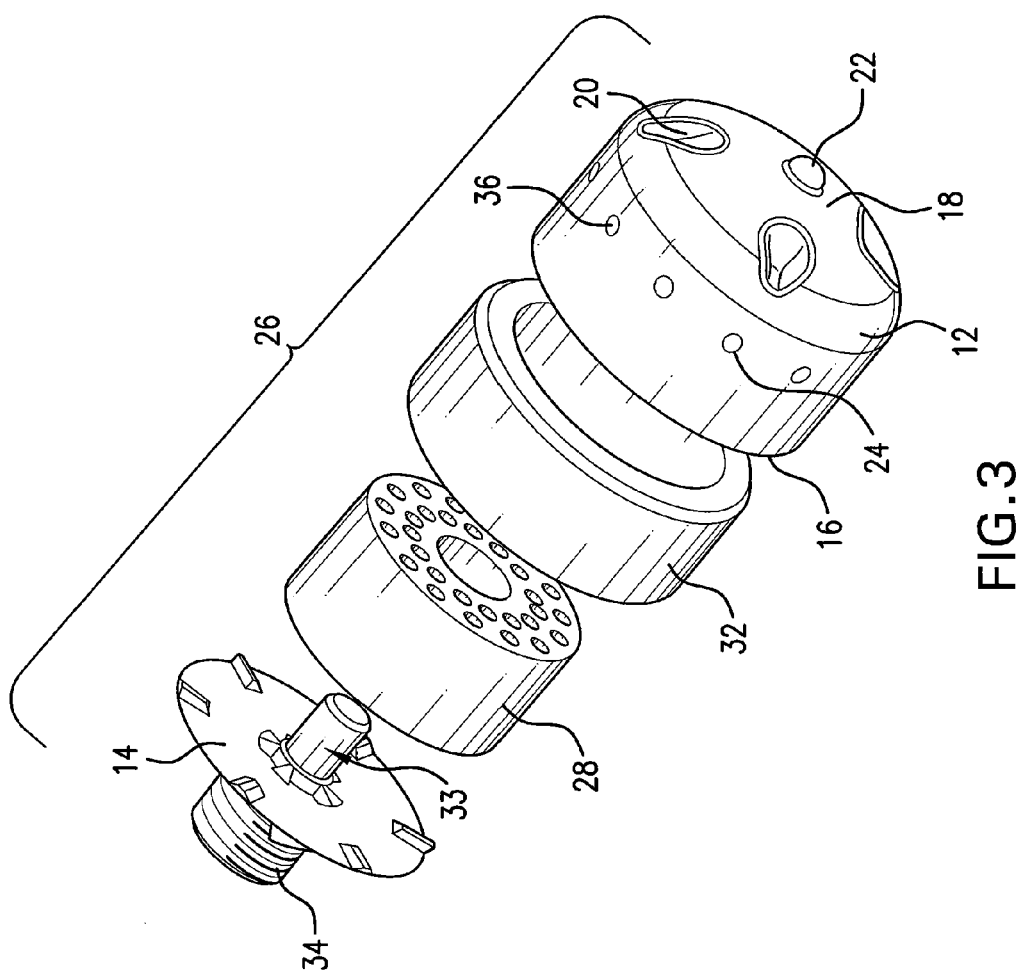
FIG. 3 is a partially exploded view of a subassembly of the pyrotechnic inflator assembly shown in FIG. 1.

The end cap 14 is joinable with the shell member 12 to at least in part enclose the open end 16 of the shell member 12 to form a subassembly, generally designated by the reference numeral 26, shown in FIG. 3. The subassembly 26 contains a quantity of pyrotechnic material 28, such as desirably in the form of a unitary grain of pyrotechnic material having a generally toroidal shape or form. A unitary grain simplifies assembly of the inflator by allowing the installation of a single component versus weighing and counting a plurality of pyrotechnic tablets, wafers or the like. Moreover, such utilization of a pyrotechnic grain can provide or result in various additional design and processing advantages such as relating to burning surface area versus time during the combustion process. For example, through proper utilization and placement of a hole or holes in the pyrotechnic grain, the pyrotechnic grain can provide or result in a burning surface area that increases with time over the time interval of interest whereas with tablets or wafers the burning surface area may decrease over a corresponding time interval. Those skill in the art and guided by the teaching herein provided will, however, appreciate that, if desired, other forms or shapes of pyrotechnic materials such as known in the art, such as tablets or wafers, for example, can be used.

The subassembly 26 serves as or acts to at least in part define a combustion chamber 30 wherein at least a portion of the quantity of pyrotechnic material 28 is reactable to form product gas for inflation of an associated airbag cushion (not shown) and, as a result, to generate pressure within the combustion chamber. The subassembly 26, more particularly, the shell member 12 may also contain a filter element 32 such as may desirably surround the pyrotechnic material, e.g., the unitary grain of pyrotechnic material, therein contained such that the filter element 32 is at least in part disposed between the pyrotechnic material 28 and the flow control orifices 24.

Those skilled in the art and guided by the teachings herein provided will appreciate that it may be desirable to include a filter element within the assembly such as to desirably serve to cool the gases formed upon combustion of the pyrotechnic material 28 prior to discharge or release of gases from the device or assembly. Alternatively or in addition, the inclusion of a filter element may desirably serve to trap or otherwise remove particulate matter from the combustion gases prior to discharge or release of gases from the device or assembly.

In general, significant or important characteristics for such filter elements typically include cost, mass, thermal conductivity of the material, surface area, pore size, and distance the gas has to travel to get through the filter element (i.e., residence time). Thus, while suitable filter elements for use in the practice of the invention can desirably take various forms, shapes or designs, wound metallic mesh or pressed, porous metallic member filter elements can be advantageous or preferred as perhaps most economically providing a filter element with sought and/or desired characteristics.

As perhaps best seen by reference to FIG. 2, the shell member indentations 20 can serve to assist or facilitate in keeping or maintaining proper placement and positioning of the pyrotechnic material, e.g., the unitary grain of pyrotechnic material, and/or the filter element 32 within the pyrotechnic inflator assembly 10.

The end cap 14 can desirably form one end of the assembly 10. The end cap 14 can also desirably at least in part contain or otherwise include an initiator 33 that upon actuation initiates reaction of the pyrotechnic material 28. The end cap 14 can desirably be formed of molded plastic with the initiator 33 integrally molded in place, such as by placing the initiator into a mold and subsequently injecting the plastic material into the mold around the initiator to form the component. While various plastic materials such as are known in the art can be used, glass-filled nylon such as 33% glass-filled nylon 6/12, may be particularly preferred. Further, if desired or required, one or more metal inserts can be included in the plastic molded cross section such as to improve the structural capability of the final component. In an alternative embodiment, the end cap can be made out of a cast or machined metal, such as aluminum, with the initiator crimped or molded in position. Those skilled in the art will appreciate that initiators and pyrotechnic materials are known in the art and that a variety of different features may be used for these components.

The end cap 14 may also desirably contain or include mounting provisions 34 such as to permit or facilitate the positioning or mounting of the pyrotechnic inflator assembly 10 such as into an airbag module or directly into a vehicle, for example. Suitable or appropriate mounting provisions 34 can take various forms or shapes such as dependent on the particular application. For example, the inflator assembly 10 includes the mounting provision 34 having the form of a threaded or twist socket.

As identified above, the thin shell member 12 and the end cap 14 are joined together to make the subassembly 26. In accordance with one embodiment, the shell member and the end cap are desirably joined together by crimping the shell member, such as formed of metal, over the end cap. In another embodiment, the end cap and the shell member, such as formed of molded plastic, can be snapped together. However, various methods or techniques, such as know in the art, can be utilized to join the shell member and the end cap together. Thus the broader practice of the invention is not necessarily limited to specific or particular joining techniques.

If desired, as shown in FIG. 3, a barrier foil 36 may be disposed within the shell member 12 so as to cover some or all of the flow control features, such as the orifices 24, such as to prevent undesired passage of material, such as dirt, for example, into the assembly through the flow control features.

A high pressure capable structure is created or formed by overwrapping the subassembly 26 with a selected material such as having the form of a composite. The subassembly 26 can and desirably does serve to hold together unassisted for the composite overwrap process.

The overwrap processing generally involves filament winding a composite material, such as composed of high strength fibers and a resin matrix system, around, about and/or over the subassembly 26 to form an overwrap thickness 40 about the subassembly.

Various fiber materials such as known in the art can be used. For improved economics, in certain embodiment the use of glass fiber or basalt fiber materials are preferred.

Those skilled in the art and guided by the teachings herein provided will appreciate that the inclusion and presence of the above-identified central projection 22 in or on the shell member 12 can desirably serve or assist in keeping or maintaining the fibers in proper position or placement during the filament winding process as, without the projection, fibers may tend to slide or slip out of position during the winding process.

The composite overwrapped subassembly can then be treated, such as by curing (e.g., UV or thermal curing) or melt processing of thermal plastic resins, for example, to form a pyrotechnic inflator assembly that withstands the pressure generated within the combustion chamber upon reaction of the pyrotechnic material but wherein the shell member is incapable of withstanding the pressure generated within the combustion chamber upon reaction of the pyrotechnic material without support provided by the composite overwrap.

Processing times can desirably be reduced or minimized by utilizing a UV cure resin system instead of common thermoset, elevated temperature cure resin systems. For example, a typical elevated temperature cure cycle involves heating at 120° C. for 90 minutes, while a UV cure system can effect cure in under 15 seconds when using an optically transparent fiber such as E-glass. UV curing has the additional safety advantage of avoiding subjecting the pyrotechnic material to elevated temperature such as could result in inadvertent actuation or other undesirable degradation of energetic materials, such as included or associated with either or both the initiator and the pyrotechnic material, for example.

The pyrotechnic inflator assembly 10 will now be further described making reference to FIGS. 3-6 and the process by which the components are assembled.

FIG. 3 is a partially exploded view of the subassembly 26 of the pyrotechnic inflator assembly 10 shown in FIG. 1. In the illustrated embodiment, the shell member 12 is formed of stamped steel with a barrier foil 36 disposed within the shell member 12 over the holes or orifices 24. The end cap 14 includes the molded in initiator 33. The initiator 33 desirably extends or projects into the toroidal-shaped compression molded pyrotechnic grain 28. The filter element 32 is disposed between the pyrotechnic grain 28 and the shell member 12 and, more particularly, the flow control orifices 24 present in the shell member 12.

Figure 4:
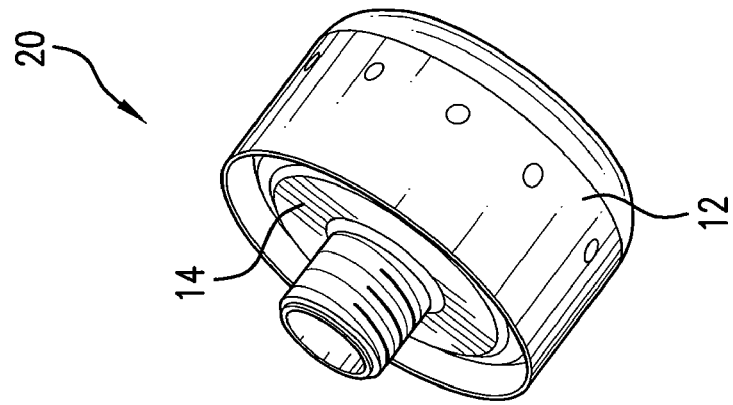

FIG. 4 illustrates the subassembly 26 after the respective placement or insertion of the filter element, the pyrotechnic grain and the end cap 14 into the shell member 12.

Figure 5:
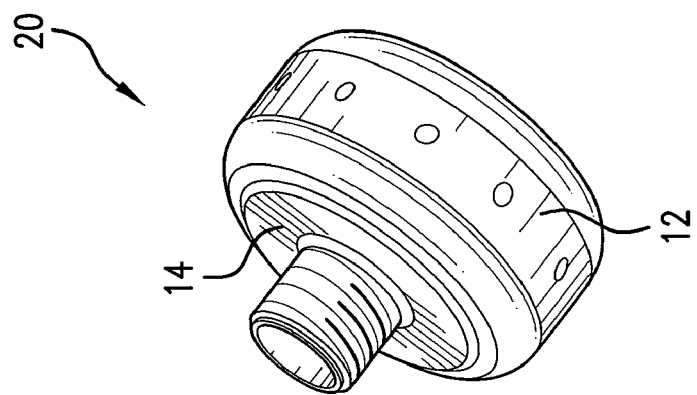

FIG. 5 illustrates the subassembly 26 after the shell member 12 has been crimped about the end cap 14 to form the subassembly ready to be overwrapped.

Figure 6:
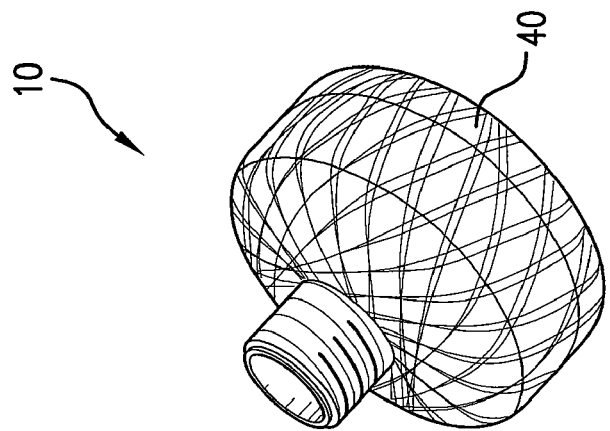
FIGS. 4-6 show selected steps in the assembly process of the pyrotechnic inflator assembly shown in FIG. 1.

FIG. 6 illustrates the final assembly after overwrapping and curing to form a pyrotechnic inflator assembly 10 that withstands the pressure generated within the combustion chamber upon reaction of the pyrotechnic material and wherein the shell member is incapable of withstanding the pressure generated within the combustion chamber upon reaction of the pyrotechnic material without support provided by the composite overwrap 40.

If desired, the composite material can be wound about the subassembly such that openings remain in the composite wrap corresponding to the flow control features, e.g., the flow control orifices, in the thin shell member.

Alternatively, a pyrotechnic inflator assembly in accordance with another embodiment, may employ a composite wrap wherein the overwrap, such as at least some of the fibers thereof cover or otherwise pass over at least some of the flow control features, e.g., the flow control orifices, in the thin shell member. In such alternative embodiment, such as upon actuation of such an installed pyrotechnic inflator assembly, either or both the high pressure and temperature of gases exiting through the orifices may instead be relied on to at least locally break or melt fibers or composite material overlying orifices to permit desired flow of the gases through the orifices. With such alternative embodiment, a barrier foil may not be required to prevent undesired passage of material through the flow control features, e.g., the flow control orifices, in the thin shell member as the overwrap may serve to prevent such passage.

Figure 9:
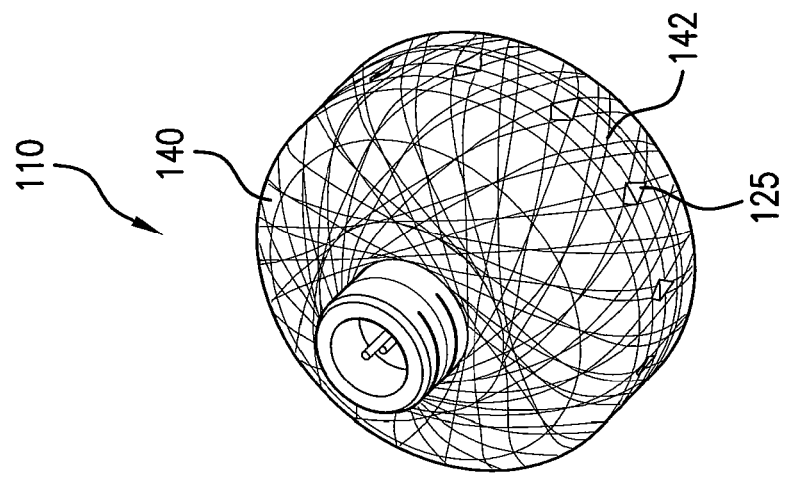
FIGS. 7-9 show selected steps in the assembly process of a pyrotechnic inflator assembly in accordance with another aspect of the invention.
Figure 8:
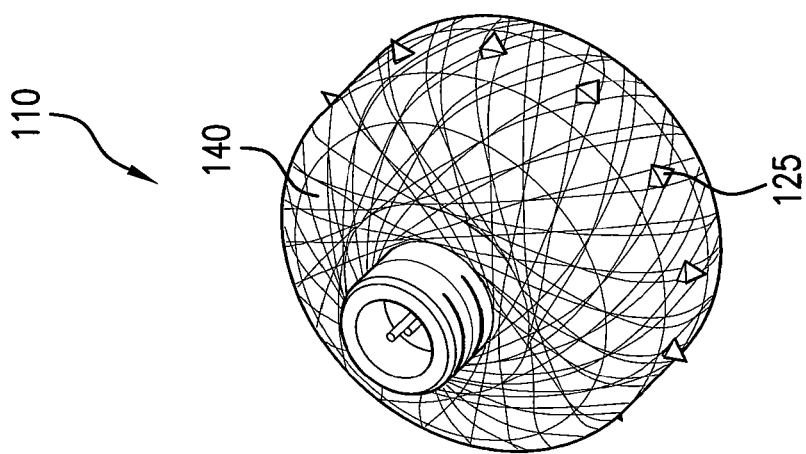
Figure 7:
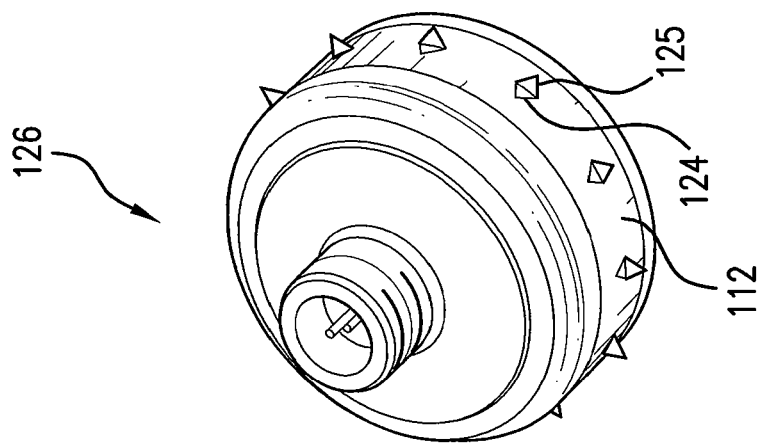

FIGS. 7-9 show selected steps in the assembly process of a pyrotechnic inflator assembly 110 in accordance with another aspect of the invention.

FIG. 7 shows a subassembly 126 generally similar to the subassembly 26 described above except that in the subassembly 126, rather than the thin shell member 112 having preformed or shaped flow control features, e.g., flow control orifices, instead has flow control features 124, e.g., flow control orifices, formed by lancing holes through the shell member 112, with the lanced out material at the orifices forming tabs designated by the reference numeral 125.

FIG. 8 shows the pyrotechnic inflator assembly 110 wherein the subassembly 126 shown in FIG. 7 has now been overwrapped with the composite 140. As shown in FIG. 8, the lanced out tabs 125 can desirably act or serve to guide overwrap material or fibers to be preferentially disposed adjacent to the orifices rather than over the orifices.

As shown in FIG. 9, such lanced out tabs 125 can desirably be subsequently bent flat or generally adjacent the sidewall 142 of the pyrotechnic inflator assembly 110 such as to present a relatively smooth contour to the pyrotechnic inflator assembly 110 in an at rest state such as may facilitate shipment, handling and placement of the assembly.

The invention provides a novel way of reducing the mass of pyrotechnic inflators, such as by replacing the thick walled pressure vessel, such as made of steel, as commonly used in such devices, with a lighter weight shell member with a composite overwrap.

More specifically, pyrotechnic inflator assemblies as herein described allows an inflator packaging volume size reduction of at least about 5% and preferably greater than 10% and a mass reduction of at least about 25%, preferably greater than 35% and, more preferably greater than 50% as compared to current state of the art pyrotechnic inflators using conventional steel housings.

Pyrotechnic inflator assemblies as herein provided also may advantageously serve to: minimize or avoid welds such as commonly required with conventional multi-piece metal housings, significantly reduce the mass and size of the required inflator assembly, permit the use of the same composite material for various shaped and sized inflator assemblies, such as to significantly reduce the inventory of parts required to make different inflator devices, and facilitate design adjustment for specific or particular applications, for example, inflators designed for higher operating pressures can be accommodated by adjusting the amount of overwrap material applied to the shell member.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention. For example, while certain embodiments have been described having an initiator at least disposed in an end cap, those skilled in the art and guided by the teachings herein provided will appreciate that the broader practice of the invention is not necessarily so limited. In particular, if desired, an initiator can be alternatively disposed within the inflator assembly such as in the shell member, for example.

What is claimed is:

1. A pyrotechnic inflator assembly containing a quantity of pyrotechnic material and having an initiator that upon actuation initiates reaction of the pyrotechnic material, the assembly comprising:
   a shell member having an open end, the shell member including a plurality of flow control features for controlling flow of product gas from the shell member;
   an end cap joinable with the shell member to at least in part enclose the open end of the shell member to form a subassembly, the subassembly containing the quantity of pyrotechnic material and at least in part defining a combustion chamber wherein at least a portion of the quantity of pyrotechnic material is reactable to form product gas for inflation of an associated airbag cushion and to generate pressure within the combustion chamber; and
   an overwrap about at least a portion of the subassembly to form a pyrotechnic inflator assembly that withstands the pressure generated within the combustion chamber upon reaction of the pyrotechnic material, the overwrap comprising a composite of fibers and a resin matrix system.

2. The pyrotechnic inflator assembly of claim 1 wherein the shell member is incapable of withstanding the pressure generated within the combustion chamber upon reaction of the pyrotechnic material without support provided by the overwrap.

3. The pyrotechnic inflator assembly of claim 1 wherein the shell member is formed of metal.

4. The pyrotechnic inflator assembly of claim 1 wherein the shell member is formed of plastic.

5. The pyrotechnic inflator assembly of claim 1 wherein the end cap is formed of molded plastic and the assembly additionally comprises the initiator integrally molded in place in the end cap.

6. The pyrotechnic inflator assembly of claim 1 wherein the end cap also includes mounting provisions for mounting the inflator assembly into an airbag module.

7. The pyrotechnic inflator assembly of claim 6 wherein the mounting provisions comprise a threaded opening in the end cap.

8. The pyrotechnic inflator assembly of claim 1 wherein the quantity of pyrotechnic material contained within the subassembly is in the form of a unitary grain.

9. The pyrotechnic inflator assembly of claim 1 wherein the shell member and the end cap are joined together to form the subassembly by crimping a rim portion of the shell member over at least a portion of the end cap.

10. The pyrotechnic inflator assembly of claim 1 additionally comprising a filter element disposed within the subassembly at least in part between the quantity of pyrotechnic material and the flow control orifices.

11. The pyrotechnic inflator assembly of claim 10 wherein the filter element comprises metal in a mesh or pressed porous form.

12. The pyrotechnic inflator assembly of claim 1 wherein the overwrap is formed by filament winding of the composite about the subassembly.

13. The pyrotechnic inflator assembly of claim 1 wherein the flow control features in the shell member comprise orifices passing through the shell member.

14. The pyrotechnic inflator assembly of claim 13 additionally comprising a pressure sensitive barrier disposed over the flow control orifices.

15. The pyrotechnic inflator assembly of claim 14 wherein the pressure sensitive barrier is disposed over the flow control orifices from within the shell member.

16. The pyrotechnic inflator assembly of claim 13 wherein the orifices passing through the shell member are covered by the overwrap prior to actuation of the pyrotechnic inflator.

17. The pyrotechnic inflator assembly of claim 1 wherein the composite fibers comprise glass or basalt fibers.

18. The pyrotechnic inflator assembly of claim 1 wherein the overwrap composite additionally comprises a UV curing agent whereby the resin matrix is UV curable.

19. A pyrotechnic inflator assembly comprising:
  a shell member having an open end, the shell member including a plurality of flow control orifices for controlling flow of product gas from the shell member;
  an end cap joinable with the shell member to at least in part enclose the open end of the shell member to form a subassembly, the subassembly containing a quantity of pyrotechnic material and at least in part defining a combustion chamber wherein the at least a portion of the quantity of pyrotechnic material is reactable to form product gas for inflation of an associated airbag cushion and to generate pressure within the combustion chamber, the subassembly also containing a filter element at least in part disposed between the quantity of pyrotechnic material and the flow control orifices, the end cap at least in part containing an initiator that upon actuation initiates reaction of the pyrotechnic material, the end cap also including mounting provisions for mounting the inflator assembly into an airbag module; and
  an overwrap about at least a portion of the subassembly to form a pyrotechnic inflator assembly that withstands the pressure generated within the combustion chamber upon reaction of the pyrotechnic material, the overwrap comprising a composite of fibers of one or more of glass and basalt and a resin matrix system;
  wherein the shell member is incapable of withstanding the pressure generated within the combustion chamber upon reaction of the pyrotechnic material without support provided by the overwrap.

20. A method of making a pyrotechnic inflator assembly, the method comprising:
  joining a shell member having an open end with an end cap to at least in part enclose the open end of the shell member to form a subassembly, the subassembly containing a quantity of pyrotechnic material and at least in part defining a combustion chamber wherein the at least a portion of the quantity of pyrotechnic material is reactable to form product gas for inflation of an associated airbag cushion and to generate pressure within the combustion chamber;
  overwrapping the subassembly with a composite of fibers and a resin matrix system; and
  treating the composite overwrapped subassembly to form a pyrotechnic inflator assembly that withstands the pressure generated within the combustion chamber upon reaction of the pyrotechnic material and wherein the shell member is incapable of withstanding the pressure generated within the combustion chamber upon reaction of the pyrotechnic material without support provided by the composite overwrap.

21. The method of claim 20 wherein the treating of the composite overwrapped subassembly to form a pyrotechnic inflator assembly that withstands the pressure generated within the combustion chamber upon reaction of the pyrotechnic material and wherein the shell member is incapable of withstanding the pressure generated within the combustion chamber upon reaction of the pyrotechnic material without support provided by the composite overwrap comprises:
  UV curing the composite overwrapped subassembly.

* * * * *